(12) United States Patent
Kurokawa et al.

(10) Patent No.: US 6,173,126 B1
(45) Date of Patent: Jan. 9, 2001

(54) CAMERAS

(75) Inventors: Toshiharu Kurokawa; Nobuhiko Togashi, both of Tokyo (JP)

(73) Assignee: Polaroid Corporation, Cambridge, MA (US)

( * ) Notice: Under 35 U.S.C. 154(b), the term of this patent shall be extended for 0 days.

(21) Appl. No.: 09/431,432

(22) Filed: Nov. 1, 1999

Related U.S. Application Data

(63) Continuation-in-part of application No. 09/219,203, filed on Dec. 22, 1998, now Pat. No. 6,055,380, and a continuation of application No. 08/808,040, filed on Mar. 4, 1997, now Pat. No. 5,870,663.

(51) Int. Cl.[7] .................................................. G03B 17/38
(52) U.S. Cl. .............................................................. 396/502
(58) Field of Search ...................................... 396/493, 502

(56) References Cited

U.S. PATENT DOCUMENTS

| | | |
|---|---|---|
| 3,810,227 | 5/1974 | Tanaka et al. . |
| 4,112,451 * | 9/1978 | Asker ................................... 396/503 |
| 4,135,797 * | 1/1979 | Ohmura et al. ...................... 396/205 |
| 4,168,891 | 9/1979 | Hirohata et al. ...................... 354/33 |
| 5,870,633 * | 2/1999 | Norris ................................... 396/33 |

OTHER PUBLICATIONS

PCT International Search Report, 23.04.99. p. 1.

* cited by examiner

*Primary Examiner*—W. B. Perkey
(74) *Attorney, Agent, or Firm*—Leslie Payne

(57) ABSTRACT

An improved camera comprising a strobe circuit, a strobe, a shutter mechanism and an actuating mechanism are disclosed. A finger engageable portion of the shutter mechanism operates the shutter. A shield is movable between a first blocking position for blocking the finger portion against engagement to prevent accidental actuation of the shutter mechanism and a second position exposing the finger portion of engagement to actuate the shutter. An assembly operatively interconnecting the shield and the strobe circuit to energize the strobe circuit when the shield is in the second position.

3 Claims, 2 Drawing Sheets

CAMERAS

CROSS-REFERENCE TO RELATED PATENT APPLICATION

This application is a continuation-in-part application of U.S. Ser. No. 09/219,203, now U.S. Pat. No. 6,055,380 filed Dec. 22, 1998. The present invention is continuation of Ser. No. 08/808,040, filed Mar. 4, 1997, now U.S. Pat. No. 5,870,633.

BACKGROUND OF INVENTION

The present invention generally relates to cameras and, more specifically, to improvements in actuators and controls for camera shutters and strobe circuits.

The prior art also includes a variety of cameras containing dual functioning elements; such as disclosed in U.S. Pat. No. 3,810,227, issued to Tanaka, wherein a movable lens cover also serves to energize a strobe circuit, as well as operate a shutter release mechanism. Another example is disclosed in U.S. Pat. No. 4,168,891, issued to Hirohata, wherein a mechanism is disclosed for cocking the shutter and energizing the flash circuit. Yet another example is disclosed in U.S. Pat. No. 4,135,797, issued to Ohmura, which discloses a camera having an interrelated shutter lock and strobe circuit.

SUMMARY OF INVENTION

In summary, the present invention includes a control device for a camera having a first portion for preventing actuation of a shutter actuator and a second position for releasing the shutter actuator and at the same time energizing a strobe. In one illustrated embodiment, provision is made for a camera having a shutter actuator, such as a finger button that is spring loaded towards one position and moved manually by the user's finger toward an opposite position in order to actuate the shutter mechanism. A control member in the form of a shield is provided to prevent inadvertent actuation of the shutter actuator. The shield is movable between a first position, preferably, overlying the actuator and preventing engagement of the actuator by the finger or other elements, and a second position spaced from the actuator to allow it to be engaged by a finger to operate the shutter to take a picture. The shield is operatively connected to a strobe or flash circuit so that when the shield is moved away from the shutter actuator, the strobe circuit will be energized to ready the camera for taking a picture.

In another illustrated embodiment of the present invention, control is provided by a control member movable between a first position, whereat it is engageable with the actuator to lock it against operation, and a second position whereat it releases the actuator for operation of the shutter. The control member has a portion which engages a switch to energize a strobe, whenever the control member is moved to the second position.

The camera of the present invention also includes an improved transmission between the actuator such as a finger button and the shutter blade including a hammer mounted for rectilinear as well as pivotal movement such that when the actuator is operated, the hammer will first move toward and downwardly with respect to the shutter blade and then upwardly striking and thereby actuating the shutter blade, and then finally returning to the starting position upon release of the finger button.

One of the objects of the present invention is to provide a camera having a novel control for locking the shutter actuator against operation in one position and releasing the shutter actuator for operation in another position while at the same time energized a strobe circuit. Included herein is such a control which is located adjacent the shutter actuator which may include a finger button.

Another object of the present invention is to provide a novel and improved camera having a cover or shield for the shutter actuator, typically a button, and which also is effective to energize a strobe or flash circuit when the shutter actuator is exposed for operation.

A further object of the present invention is to provide a camera including a novel and improved mechanism for operating the shutter. Included herein is such a mechanism that enhances the speed of the shutter.

A still further object of the present invention is to provide a camera that may incorporate the aforementioned improvement in a relatively compact or miniature body suitable for economical manufacture while at the same time allowing the camera to be easily operated and readily handled without accidental operation of the shutter.

Other objects and advantages of the present invention will become apparent in the following more detailed description taken in conjunction with the attached drawings:

BRIEF DESCRIPTION OF THE INVENTION

FIG. 1 is a perspective view of a camera embodying the present invention in one preferred from;

DETAILED DESCRIPTION

Figure 1:
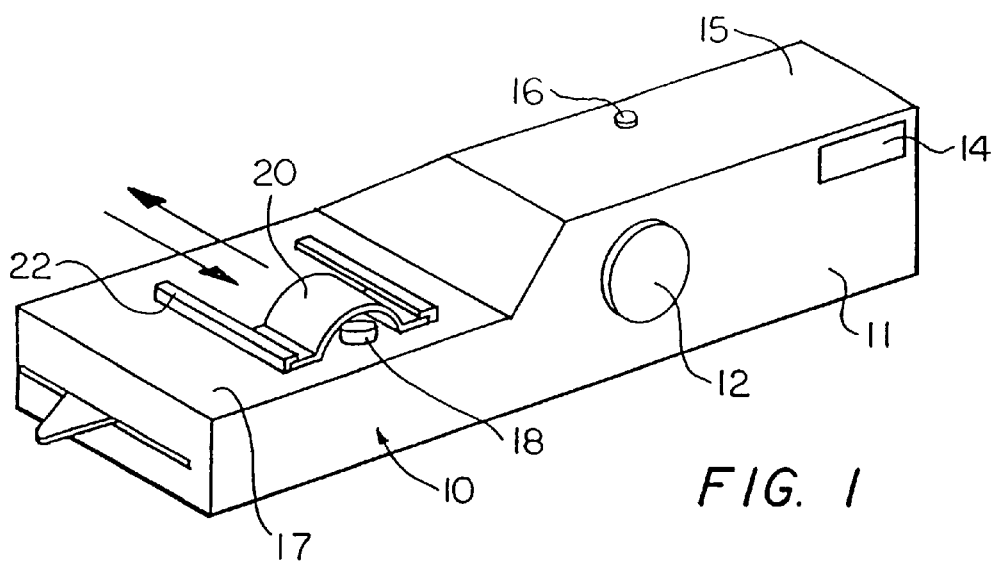

Referring now to the drawings in detail, there is shown for illustrative purposes only a camera 10 constituting one preferred embodiment of the present invention and including a housing 12 having a generally parallelepiped construction and including an objective lens 12 opening into a generally elongated front wall 14. A view finder 16 is also provided also opens into the front wall 11 at an upper right location relative to the lens 12 when viewed in FIG. 1. The upper surface of the camera includes a generally rectangular top portion 15 and a generally rectangular top portion 17 recessed below portion 15 and a generally rectangular top portion 17 recessed below portion 15 as shown in FIG. 1. A suitable strobe indicator light 16 is provided in the top portion 15 for indicating when the strobe circuit (not shown) is energized. The camera 10 can be similar to that described in copending U.S. patent application Ser. No. 08/808,040, now U.S. Pat. No. 5,870,633.

The recessed top wall portion 17 includes an upwardly projecting shutter actuator shown as a button 18 which upon depression by a finger will of course actuate the shutter. Upon release, the button is urged to its projected or extended position by a spring mechanism (not shown) in accordance with any conventional mechanism.

In order to prevent accidental or inadvertent operation of the shutter mechanism by depressing button 18, a shield generally designated 20 is provided for covering the button 18 when the shield 20 is in a first position overlying the button and preventing engagement and depression of the button. In the preferred embodiment, the shield is made from any suitable plastic and transparent material and is mounted for slidable movement transversely of the longitudinal direction of housing 10 for movement between the first position mentioned above overlying the button 18 and a seocnd position retracted towards the rear wall of the camera exposing the button 18 for operation. Further in this specific embodiment, shield 20 has a generally raised or arcuate central portion and opposite end flanges with depending mounting table (not shown) received in slots 22 shown to extend transversely of the camera housing 10 on opposite sides of the shield 20. Although one specific shield construction and mounting has been shown and described, it will be appreciated by those of ordinary skill in this art, that other shield constructions and shapes may be employed as well. The shield can be made of a transparent plastic material.

In accordance with the present invention, shield 20 is operatively connected to a switch (not shown) in the circuit for the strobe such that when the shield 20 moves into the blocking position where it covers shutter button 18, the strobe circuit will be-energized as will be indicated at 16. When the shield 20 is slid along slots 22 away from button 18 to expose the same, the strobe circuit will be energized for taking a picture. Any suitable strobe circuit and switch operable by the shield 20 may be utilized.

Figure 3:
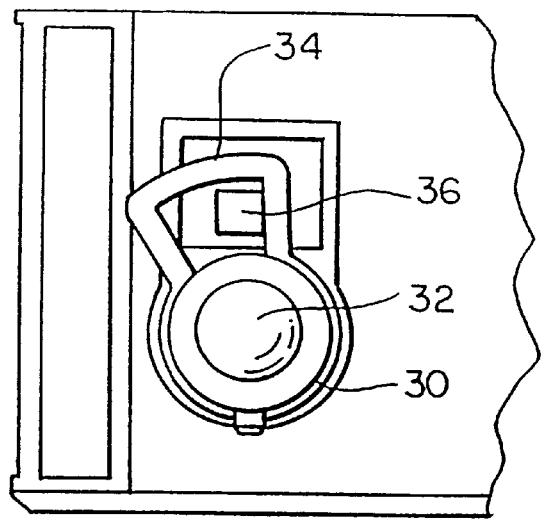
FIG. 3 is a plan view of a fragmental portion of the camera of FIG. 2 showing another mechanism for controlling actuation of the shutter and energization of the strobe circuit; and, FIG. 4 is a fragmental elevational view of the shutter actuating button including an associated lock mechanism included in the camera of FIG. 2.
Figure 4:
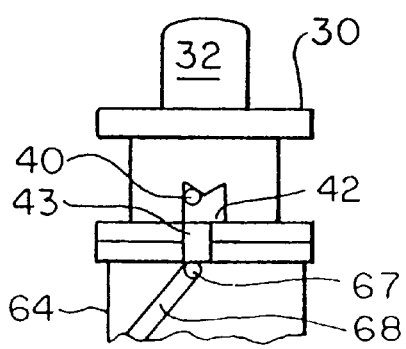
Figure 2:
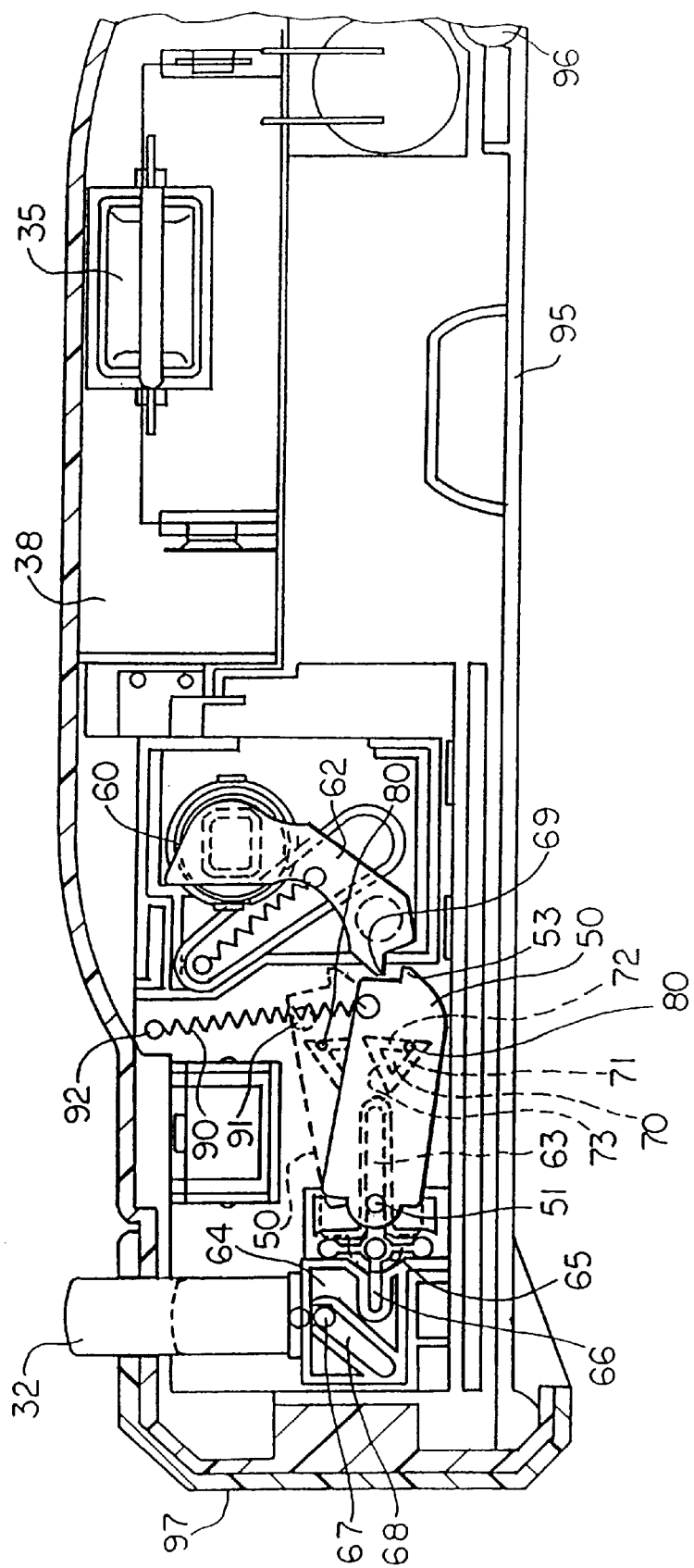
FIG. 2 is a front elevational view of another camera constituting another preferred embodiment of the invention with certain parts removed.

Referring now to FIGS. 2 to 4, there is illustrated another preferred embodiment of the present invention wherein the control is in the form of a rotatable member, preferably a sleeve generally designated 30 mounted for rotation about the actuating button 32. In the preferred form, button 32 is a vertically slidable plunger having a lock projection or pin 40 for engaging a lock surface 42 formed in the sleeve 30 as shown in FIG. 4 when sleeve 30 is in one angular position. When sleeve 30 is rotated about plunger 32 to a second angular position, lock pin 40 will be moved away from lock surface 42 and into a longitudinal passage 43 in the wall of sleeve 30 to permit the button-plunger 32 to be depressed for actuating the shutter 60. In the preferred embodiment sleeve 30 is provided with a longitudinally and circumferentially extending slot providing the lock surface 42 and passage 43 as shown in FIG. 4.

Referring to FIG. 3, control sleeve 30 has a tab 34 radially projecting from it for receiving a switch actuator 36 in a slot formed through tab 34. When sleeve 30 is rotating from the locking to the unlocking position, one edge 37 of the tab slot will engage switch actuator 36 to move it to energize the strobe circuit 38. When the sleeve 30 is rotated back to its locking position the opposite edge 39 of the tab slot will engage switch 36 to deenergize the strobe circuit 38.

Referring to FIG. 2, button-plunger 32 is biased by a spring (not shown) to its raised or normal position during which time the shutter 60 is in the closed position blocking the lens path of the camera. When the button-plunger is unlocked by control sleeve 30 as described above, the strobe circuit 38 will be energized by switch 36 moved by tab 34. Button-plunger 32 may then be depressed to actuate the shutter 60 and take a picture.

Actuation of shutter 60 is effected through a hammer generally designated 50 mounted for pivotal movement about a pivot 51 which in turn is mounted for rectilinear movement towards and away from the shutter blade 62. The latter is achieved through a passage 63 formed or otherwise provided in the camera frame as best shown in FIG. 2. Pivot 51 in the specific embodiment shown is mounted in a carrier including a slide piece 64 and a hub piece 65 having a cruciform shape in the shown embodiment including an arm 66 received in a slot formed in the slide piece 64. As shown in FIG. 4 a slide piece 64 can have another configuration. FIG. 2 shows the hub piece 65 in the position when the hammer 50 is extended and the position when the hammer 50 is retracted. Slide piece 64 is moved to the right as viewed in FIG. 2 when button-plunger 32 is depressed by means of a cam and follower action. A pin 67 on the plunger 32 acts as a cam and engages an inclined surface 68 formed in the specific embodiment by a slot in slide piece 64 which acts as a cam follower driven by cam pin 67. In turn, the hub piece 65 also moves to the right causing the hammer 50 to also move to the right towards the shutter blade 62.

While it moves to the right as described above, hammer 50 is also pivoted downwardly by a cam 70 suitably fixed to the frame of the camera. Cam 70 has an inclined cam surface 71 that will engage a follower pin 80 fixed to the hammer 50 such that it will follow the cam surface 71 and pivot downwardly along with the hammer 50 as it is pivoted towards the shutter blade 62 by carrier 64,65 upon depression of button-plunger 32. As hammer 50 is pivoted downwardly a tension spring 90 will be stretched under tension until such time as the follower pin 80 leaves the lower end of cam surface 71 whereupon spring 90 will retract causing follower pin 80 to rise in a slot 72 along a cam surface thereof thus causing hammer 50 to pivot upwardly about it pivot 51. This will cause a nose portion 53 on the end of the hammer to engage a nose portion 69 on the shutter blade 62 causing the shutter to move to the open position. When the control button 32 is released, the spring bias will return it to its raised position and the carrier 64,65 to the left-most position viewed in FIG. 2 as the hammer 50 pivots downwardly and moves to the left under the control of a cam slot 73 which receives follower pin 80. FIG. 2 shows the lower and upper positions of the hammer 50. Tension spring has one end connected to the end of the hammer 50 at 91 and its opposite end anchored to a pin 92 fixed to the camera frame.

Any suitable view finder 94 is included in the camera, and a film loading door 95 is provided in the bottom wall of the camera as shown in FIG. 2. Door 95 is pivoted at 96 to the camera frame, and an end piece 97 closes the opposite end of the camera and secures the door 95 in closed position.

Although several preferred embodiments of the invention have been shown and specifically described, it will be readily appreciated by those of ordinary skill in the art that other embodiments of the invention although not disclosed will still be covered by the scope of the present invention indicated in the appended claims.

What is claimed is:

1. In a camera having a shutter movable between open and closed positions, means for actuating the shutter to open positions including a hammer mounted for pivotal and rectilinear movement towards and away from the shutter, said hammer being arranged to engage and actuate the shutter upon upward pivotal movement of the hammer, wherein said actuating means includes a carrier holding said hammer, and a manual actuator engageable with said carrier to actuate the carrier for rectilinear movement, a cam follower on said hammer, and a dam on the carrier and engageable with said cam follower to pivot said hammer upon rectilinear movement.

2. The camera defined in claim 1 wherein said means includes a spring means urging said hammer to an upward position.

3. The camera defined in claim 2 wherein said means includes spring means urging said carrier and manual actuator to a normal position wherein said hammer is spaced from the shutter.

\* \* \* \* \*